United States Patent [19]
Brady et al.

[11] Patent Number: 5,574,952
[45] Date of Patent: Nov. 12, 1996

[54] DATA STORAGE SYSTEM AND METHOD FOR OPERATING A DISK CONTROLLER INCLUDING ALLOCATING DISK SPACE FOR COMPRESSED DATA

[75] Inventors: James T. Brady; Jaishankar Menon, both of San Jose, Calif.

[73] Assignee: International Business Machines Corporation, Armonk, N.Y.

[21] Appl. No.: 241,987

[22] Filed: May 11, 1994

[51] Int. Cl.[6] .................................................. G06F 12/00
[52] U.S. Cl. .......................... 395/888; 395/885; 395/886; 395/601; 341/95
[58] Field of Search ...................................... 395/439, 442, 395/497.04, 888, 600, 885, 886; 369/54, 58; 360/48; 341/51, 95

[56] References Cited

U.S. PATENT DOCUMENTS

| | | | |
|---|---|---|---|
| 4,872,009 | 10/1989 | Tsukiyama et al. | 341/95 |
| 5,179,378 | 1/1993 | Ranganathan et al. | 341/51 |
| 5,237,460 | 8/1993 | Miller et al. | 360/8 |
| 5,237,675 | 8/1993 | Hannon, Jr. | 341/95 |
| 5,247,646 | 9/1993 | Osterlund et al. | 395/888 |
| 5,357,614 | 10/1994 | Pattisam et al. | 395/250 |
| 5,394,534 | 2/1995 | Kulakowski et al. | 395/439 |
| 5,459,842 | 10/1995 | Begun et al. | 395/888 |

FOREIGN PATENT DOCUMENTS

| | | |
|---|---|---|
| 587437A2 | 9/1993 | European Pat. Off. . |
| WO91/19255 | 12/1991 | WIPO . |
| WO92/17844 | 10/1992 | WIPO . |

OTHER PUBLICATIONS

ACM Sigplan Notices, vol. 27, No. 9, Sep. 1992, M. Burrows et al. (pgs. 2–9) "On–line Data Compression in a Log–structured File System".

Computer Technology Review, vol. 10, No. 15, Dec. 1990 (pgs. 26–28) F. Hannon, "What's Keeping Data Compression Off Disks?".

European Search Report—EP 95 30 3136—22 Dec. 1995.

R. Baird et al., "Synchronous Pair Block Recording", IBM Technical Disclosure Bulletin, vol. 25, No. 4, Sep. 1982, pp. 2053–2056.

Rosenblum et al., "The Design and Implementation of a Log–Structured File System", ACM Transactions on Computer Systems, vol. 10, No. 1, Feb. 1992, pp. 26–52.

Patterson et al., "A Case For Redundant Arrays of Inexpensive Disks (RAID)", ACM Sigmod Conference, Chicago, Illinois, Jun. 1–3, 1988, pp. 109–116.

*Primary Examiner*—Jack B. Harvey
*Assistant Examiner*—Ario Etienne
*Attorney, Agent, or Firm*—Ohlandt, Greeley, Ruggiero & Perle

[57] ABSTRACT

A data storage system and method for operating a disk controller, and also a disk controller operated in accordance with the method are disclosed. The method includes the steps of allocating a first amount of disk space for a compressed data unit as a first predetermined percentage of an uncompressed size of the data unit; and then increasing the allocation by a second predetermined percentage that is less than the first predetermined percentage to obtain a total amount of allocated disk space. The first predetermined percentage is a function of an expected compression ratio for the data unit, and the second predetermined percentage is a function of an expected change in the size of the compressed data unit as a result of an update operation performed on the data unit. The method further includes compressing the updated data unit; comparing the size of the compressed updated data unit to the total amount of allocated disk space; and if the size of the compressed updated data unit is equal to or less than the total amount of allocated disk space, storing the compressed updated data unit within the allocated disk space. Otherwise, if the size of the compressed updated data unit is greater than the total amount of allocated disk space, other disk space is allocated for storing the compressed data unit.

7 Claims, 4 Drawing Sheets

LOGICAL TO PHYSICAL TRACK DIRECTORY

DATA STORAGE SYSTEM AND METHOD FOR OPERATING A DISK CONTROLLER INCLUDING ALLOCATING DISK SPACE FOR COMPRESSED DATA

FIELD OF THE INVENTION

This invention relates generally to methods and apparatus for managing mass storage devices and, in particular, to log-structured file systems for mass storage devices.

BACKGROUND OF THE INVENTION

Known types of standard disk controllers do not support data compression although more recent disk controllers, organized in a log-structured manner, can support data compression. However, the operation of conventional log-structured disk controllers may cause sequentially stored data to become stored discontiguously on the disk. This results in a loss of locality of reference and leads to a degradation in performance for some workloads, such as database applications.

A log-structured file system (hereinafter referred to as LSFS) is described by M. Rosenblum and John K. Ousterhout in an article entitled "The Design and Implementation of a Log-Structured File System", ACM Transactions on Computer Systems, Vol. 10, No. 1, February 1992, pages 26–52.

Briefly, the LSFS is a technique for disk storage management wherein all modifications to a disk are written sequentially to a log-like file structure. The log-like file structure is the only structure on the disk, and it contains indexing information so that the files can be read back from the log in an efficient manner.

An aspect of the LSFS approach is that large free areas are maintained on the disk in order to speed-up the write process. To maintain the large free areas, the log is divided into segments, and a segment cleaner (garbage collector) is employed to compress live information from heavily fragmented segments, thereby freeing up segments for subsequent writes.

A goal of the LSFS is to improve the efficiency of disk writes by utilizing a larger percentage of the disk bandwidth than other disk management techniques. That is, instead of making a large number of small writes to the disk, the data is instead collected in the storage subsystem cache or buffers, and the file cache is then written out to the disk in a single large I/O (disk write) operation. The physical writing of the segment, however, can proceed in increments.

As was noted above, one problem that arises from the use of such a LSFS is that compressed/compacted data can be scattered over multiple disk locations, thus reducing seek affinity and increasing response time. This problem can be especially troublesome when records are read from the disk, are updated and compressed, and then written back to the disk.

More specifically, read and write requests to disk controllers are typically accompanied by the physical address(es) to or from which data is to be read or written. For example, read/write requests to well known SCSI-type disk controllers are accompanied by the starting physical sector number and the number of sectors to be read/written. In traditional disk controllers, a write operation operates to send uncompressed data to the controller, and the uncompressed data is stored within the indicated sectors, thereby replacing the previous contents of the indicated sectors.

A log-structured disk controller that supports data compression, on the other hand, operates as follows. In that data compression, more particularly the data compression ratio, is data dependent, writes to the disk controller are not written in place, but are instead written to new locations on disk that were previously empty. The disk controller divides the disk into segments, some of which are kept "empty". New writes from the system are written into sectors located within empty segments. As a result, each write or update of data causes the data to be written to new physical locations, and the previous physical locations of the data are subsequently garbage collected and reused for future writes. Furthermore, in a log-structured disk controller a directory must be maintained to map the addresses used by the system to the physical addresses at which the data is actually stored within the log structure.

This is clearly different than the operation of a conventional disk controller, where the data is always updated in place, and where the address specified in the request from the system is the same as the address at which the data is stored on the disk(s).

To summarize, known-types of conventional log-structured disk controllers do not update data in place, and they maintain a directory to find the current location of any piece of data.

In that data compression techniques are sensitive to the data being compressed, even a relatively small change to a record can result in the compressed image growing in size relative to the previous, unmodified compressed image. Thus, even if an update in place mechanism were available with the conventional log-structured disk controllers, if the compressed data image grows in size there is a high probability that it will not fit back into its previous position within the LSFS. In this case it would still be necessary to re-write the compressed data image to another physical location within the disk. As a result, a once physically and logically contiguous sequence of records would still be fragmented and scattered, thereby increasing seek times for subsequent accesses to the records.

It is also known in the art to employ, instead of one large disk (also referred to as a Single Large Expensive Disk or SLED), a Redundant Array of Inexpensive Disks (RAID), as described by D. A. Patterson, G. Gibson, and R. H. Katz in an article entitled "A Case for Redundant Arrays of Inexpensive Disks (RAID)" ACM SIGMOD Conference, Chicago, Ill., Jun. 1–3, 1988, pages 109–116. An advantage of the RAID approach is that it enables the disk subsystem of a data processor to keep pace with the continuing improvements in processor speed and main memory density. However, the authors show that the Mean Time To Failure (MTTF) of the RAID storage system is given by the MTTF of a single disk divided by the total number of disks in the array. As such, an important consideration in the RAID system is the provision of error detection and correction information, check disks containing redundant information, and crash recovery techniques.

In the Patterson et al. publication five different levels of RAID are described. Level one employs mirrored disks (full redundancy of all disks, both data and check disks), level 2 employs a hamming code for the error correction information to reduce the number of check disks, level 3 employs a single check disk per group of data disks, level 4 employs independent read/write operations wherein the individual transfer information is contained within a single disk unit and is not spread across several disks, and level 5 (RAID5) spreads both the data and the data integrity (parity) information across all disks, including the check disk.

OBJECTS OF THIS INVENTION

It is an object of this invention to provide an improved LSFS for use with mass storage devices.

It is another object of this invention to provide an improved LSFS with a RAID mass storage system.

It is one further object of this invention to provide an improved log-structured disk control method which allows support of data compression and update in place operations.

SUMMARY OF THE INVENTION

The foregoing and other problems are overcome and the objects of the invention are realized by a method for operating a disk controller, and by a disk controller operated in accordance with the method. The method includes the steps of allocating a first amount of disk space for a compressed data unit as a first predetermined percentage of an uncompressed size of the data unit, and then increasing the allocation by a second predetermined percentage that is less than the first predetermined percentage to obtain a total amount of allocated disk space. In a presently preferred, but not limiting embodiment of this invention, the first predetermined percentage is approximately 30 percent, and the second predetermined percentage is approximately 5 percent. More generally, the first predetermined percentage is a function of an expected compression ratio for the data unit, and the second predetermined percentage is a function of an expected change in the size of the compressed data unit as a result of an update operation performed on the data unit.

The method further includes the steps, executed in response to an update operation performed on the data unit, of compressing the updated data unit; comparing the size of the compressed updated data unit to the total amount of allocated disk space; and if the size of the compressed updated data unit is equal to or less than the total amount of allocated disk space, storing the compressed updated data unit within the allocated disk space. Otherwise, if the size of the compressed updated data unit is greater than the total amount of allocated disk space, the method allocates other disk space for storing the compressed data unit.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
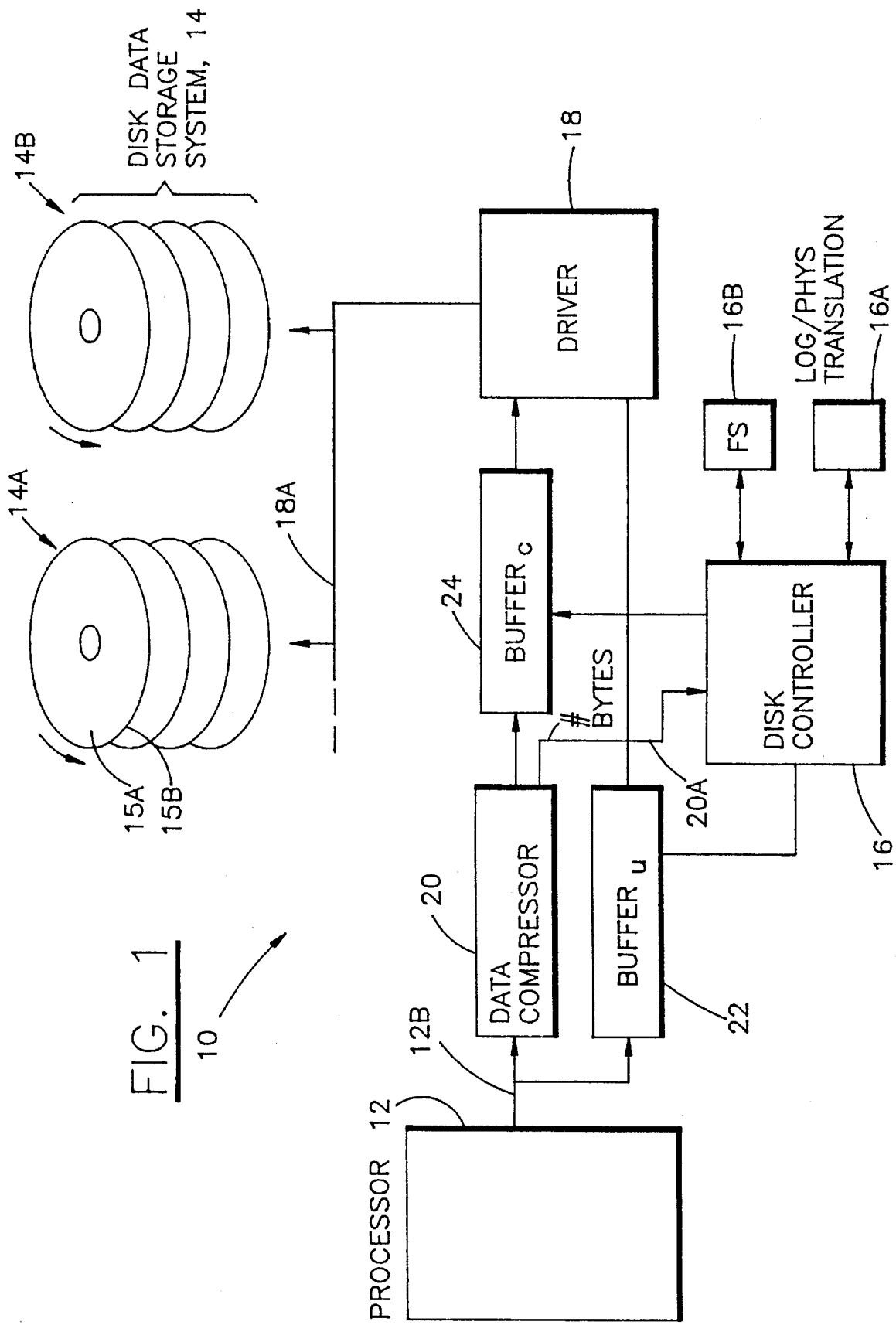
FIG. 1 is a block diagram illustrating a data processing system that is constructed and operated in accordance with this invention.

Reference is made to the block diagram of FIG. 1 for showing a data processing system 10 that is constructed and operated in accordance with this invention. System 10 includes at least one data processor 12. Bidirectionally coupled to the data processor 12 is a data path 12b and an associated disk data storage system 14. The disk data storage system 14 may comprise from one disk drive unit to a plurality of disk drive units. For example, in the illustrated embodiment the disk data storage system 14 is comprised of a first disk drive unit 14a and a second disk drive unit 14b. Each disk drive unit may comprise from one to n individual disks each having a first data storage surface 15a and a second data storage surface 15b.

In a presently preferred embodiment of this invention the disk data storage system 14 is organized and operated as a RAID system that is similar to that described in the Patterson, Gibson, and Katz publication referenced in the Background portion of the specification. It should be realized that the use of RAID-type of disk data storage system is not to be construed as a limitation upon the practice of this invention.

The system 10 further includes a LSFS disk manager or log-structured controller 16 that operates in accordance with the teaching of this invention. Coupled between the disk data storage system 14 and the controller 16 are the necessary disk device drivers 18. The drivers 18 interact with the disk units 14a and 14b at a low level so as to enable the disk units to be read and written. The understanding of the functioning of the drivers 18 is not germane to an understanding of this invention. As an example only, the disks 14a and 14b, and the drivers 18, may all be connected through a bus 18a such as a well known SCSI bus.

Also coupled to the disk controller 16 is a data compression unit 20, a buffer 22 for storing uncompressed data ($BUFFER_u$) that is intended to be written to the disk data storage system 14, and a buffer 24 that stores the compressed data ($BUFFER_c$) that is output from the data compression unit 20. A signal path 20a enables the disk controller 16 to interrogate the data compression unit 20 to determine a number of bytes that comprise the compressed data unit and also the original, uncompressed data unit. If the data compression unit 20 does not provide this information, it is within the scope of this invention to employ counters or similar means to count the bytes as they are loaded into the buffers 22 and 24. Based on this information the disk controller 16 makes a determination whether to write the compressed image in buffer 24 or the uncompressed data in buffer 22 to the disk data storage system 14.

The number of bytes in the compressed data unit is a function of the data compression ratio. As employed herein the data compression ratio is a ratio, for a given data unit such as track or record, of the uncompressed data (in bytes) to the compressed data (in bytes). By example, if the uncompressed data consists of 600 bytes, and the compressed image thereof consists of 200 bytes, then the data compression ratio for this data unit is 3:1.

It is pointed out that data compression may not always result in the generation of fewer bytes. For example, it is known that for some data the "compressed" image may actually be as much as 12% larger than the uncompressed data. In this case the disk controller 16 writes the uncompressed data unit from the buffer 22 to the disk data storage system 14, as opposed to the compressed data unit from the buffer 24.

Figure 2:
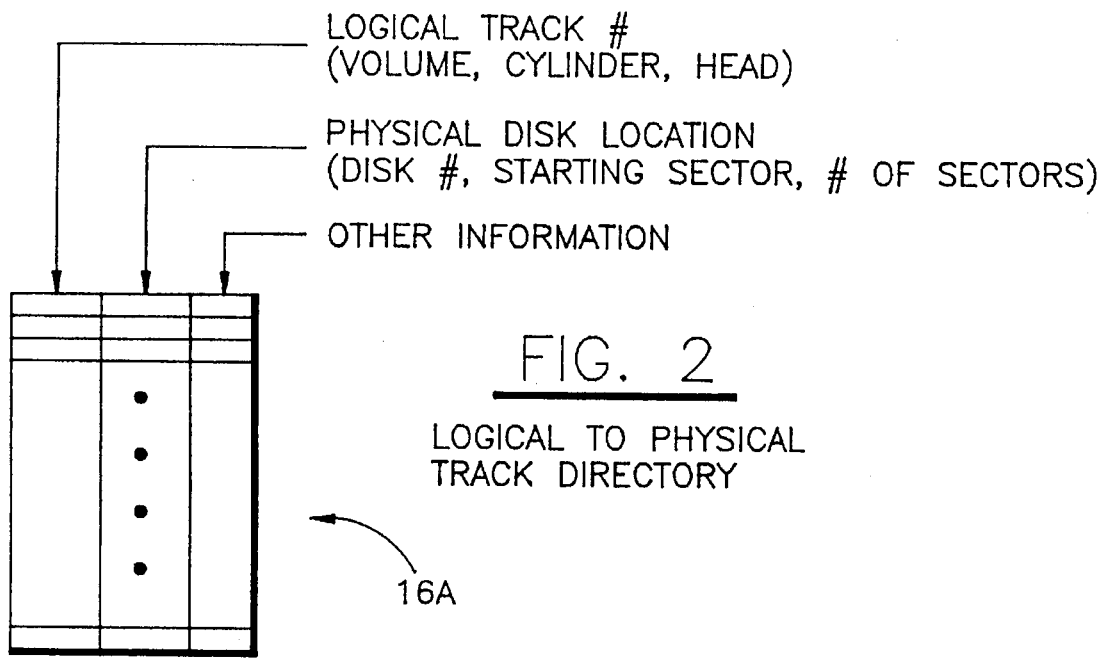
FIG. 2 illustrates the format of a logical to physical track directory.

The LSFS disk controller 16 also includes a memory 16a for storing a logical to physical disk track directory for the LSFS. FIG. 2 illustrates an exemplary format for the data stored within the memory 16a. When allocating space for compressed data units in the disk data storage system 14 the disk controller 16 accesses the memory 16a and stores in an entry thereof the logical track number in association with the physical disk location, and also stores other information as required for the particular system implementation. In general, the memory 16a is employed to map the logical data unit locations which are known to the system and application to the actual, physical locations within the log-structured file system.

Figure 3:
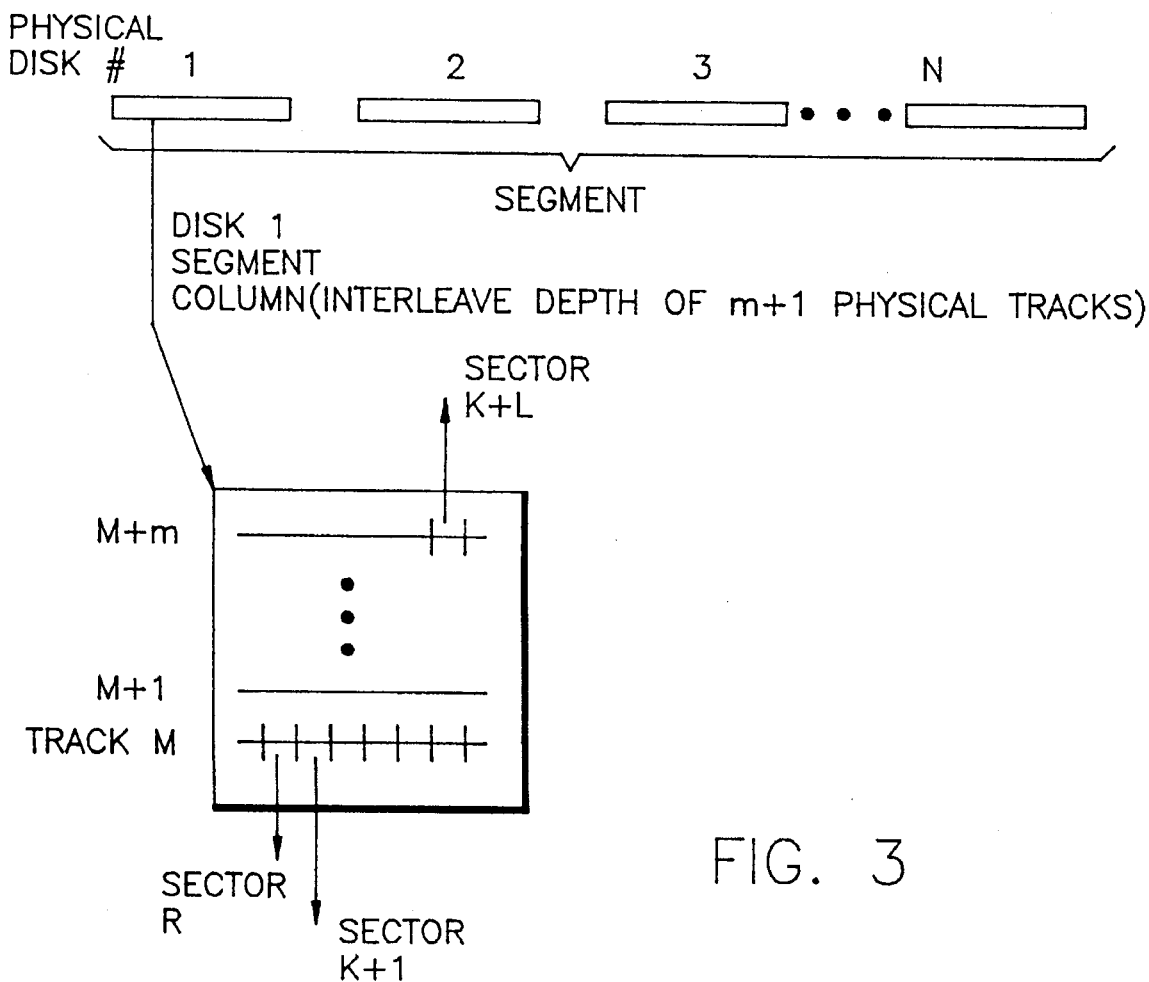
FIG. 3 illustrates an exemplary segment written over N disks in a RAID storage system.

As was indicated, in a presently preferred embodiment of this invention the disk data storage system is a RAID-type system. A write to the disk preferably writes a parity group segment over all N disks, for example 7 data disks and a parity disk. FIG. 3 illustrates an exemplary interleave depth of m+1 physical tracks for a disk segment column. It should be realized that the interleave depth can also be specified as an extent of L+1 physical sectors. In general, an interleave depth of one implies that one parity group segment will occupy one physical disk track, an interleave depth of two implies that one parity group segment will occupy two physical disk tracks, etc.

Although this invention is described in terms of tracks, it should be realized that other units are applicable as well. On a disk write or update operation the track is compressed and the updated compressed track is written to the same physical location (some number of contiguous sectors) on disk that it currently occupies, so long as the compressed track still fits within the allocated location. Each time a track is updated, it may occupy a different number of bytes than before, since the degree of compression achieved is a function of the value of the data being compressed. The track is written to a different location than which it currently occupies only if it no longer will fit within the originally allocated location.

In accordance with this invention, it has been determined that updated tracks will fit into their originally allocated location with a high probability (99.9%) so long as the disk controller 16: (a) always allocates at least 30% of the nominal (uncompressed) track size for a track; and (b) also allocates a predetermined percentage (5%) of additional space (padding space) over and above the compressed size of the track. As a result, the seek affinity is preserved and tracks do not often change their disk locations.

It is also within the scope of the invention to periodically remerge the tracks to correct for the gradual loss of seek affinity caused by the slow migration of tracks away from their originally allocated locations on those occasions when they do not fit back into their originally allocated locations.

In accordance with this invention every track with data has a home location. A track without data, for example a newly initialized database record, does not have a home location until data is written into the track for the first time (first update). This is preferred because a newly created track or block is typically filled with padding characters that have a tendency to have a very high compression ratio. For example, a sequence of the padding character $00_{16}$ may exhibit a compression ratio of 96:1. If storage is allocated based on an uninitialized logical block it may be difficult or impossible to subsequently update the block in place when an application stores data into the block.

If the current size of the track (following compression) is smaller than or equal to the space originally reserved for it in its home location when the track was initially written or subsequently moved, as determined from the data compression unit 20 and the corresponding track entry within the directory stored within the memory 16a, the compressed track (or the uncompressed track if smaller) is written back into its home location by the disk controller 16. Otherwise, an overflow indication is generated and the track is written to a new location within the free space of the disk data storage system 12, and the logical to physical track directory stored in the memory 16a is updated accordingly. A list 16b of the free space (FS) is maintained for this purpose by the disk controller 16, the free space list being revised as required during garbage collection of previously allocated space that is no longer used. Suitable techniques for maintaining and managing the list 16b of free space are known in the art.

It can be seen that this invention enables the operation of the log-structured disk controller 16, that stores compressed data, in a manner similar to that of a convention disk controller, wherein update in place operations can occur. Only on an overflow condition, when the compressed data is larger than the originally allocated space on the disk, does the controller 16 operate in the log-structured mode to store the compressed track into a new location, and to update the directory in memory 16a accordingly.

Figure 4:
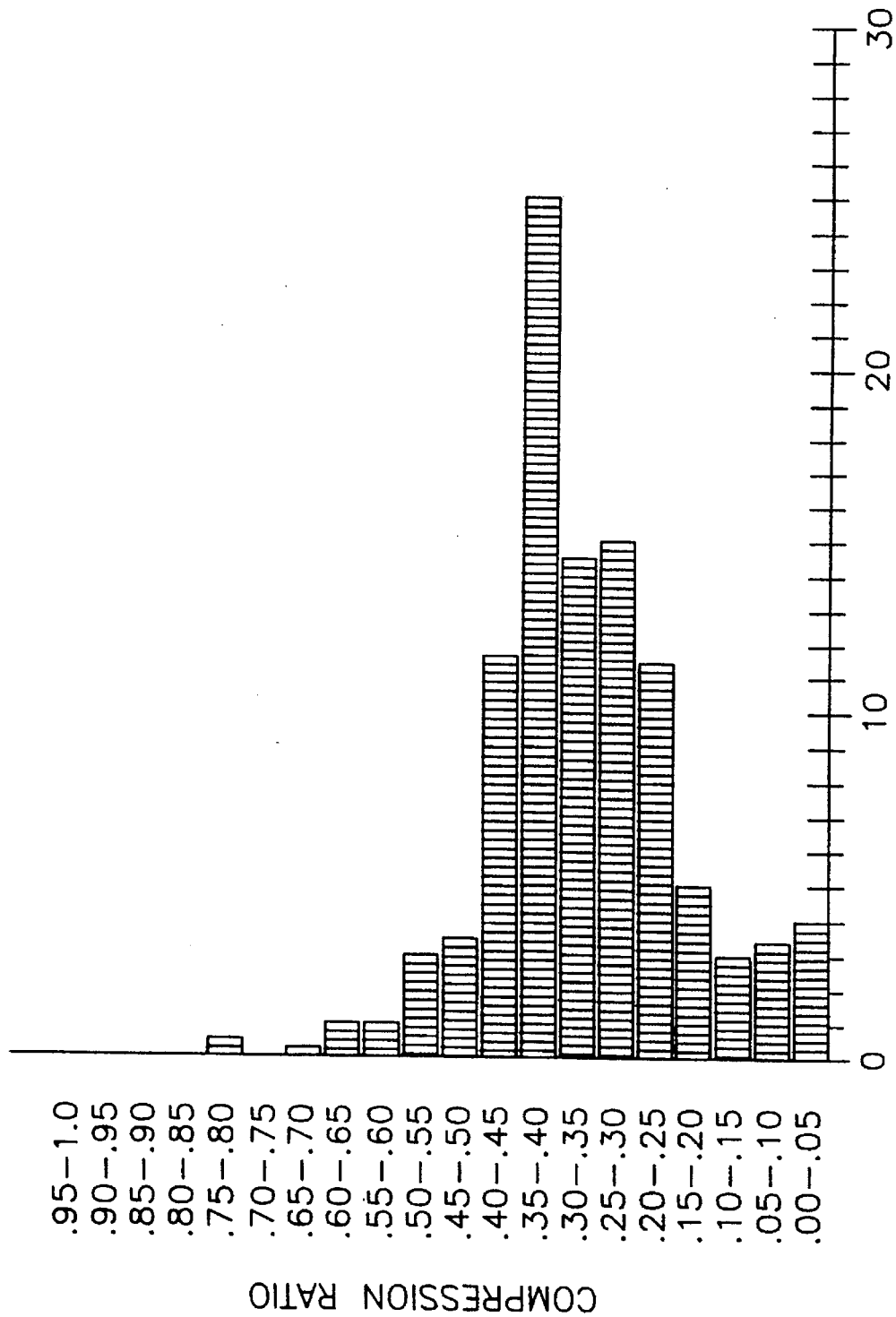
FIG. 4 is a graph depicting a histogram of individual compression ratios by transfer.

This invention assumes that the compression ratio will be typically be within the range of approximately 0.2 to 0.4, with 3.6:1 being a typical value. The rational for this assumption is described with respect to FIG. 4. FIG. 4 illustrates a histogram obtained for a number of different records generated by a number of different applications. The distribution of compression ratios exhibits a well-defined peak in the range of 0.2 to 0.5. As a result, the 30% figure given above is based on an expected, most probable, compression ratio for a track.

With regard to adding padding space to the storage for each logical block at space-allocation time, the objective is to reduce to an acceptable level (for example 1%) the probability that a given block will fail to fit into the available space after the block is subsequently updated.

It has been found that smaller-than-average compressed blocks exhibit a strong tendency to become larger when they are updated. For this reason, and in accordance with an aspect of this invention, the storage requirement assumed at allocation time is preferably always at least 30% of the nominal block size. The additional padding space, for example 5%, is then added to this assumed storage size.

Figure 5:
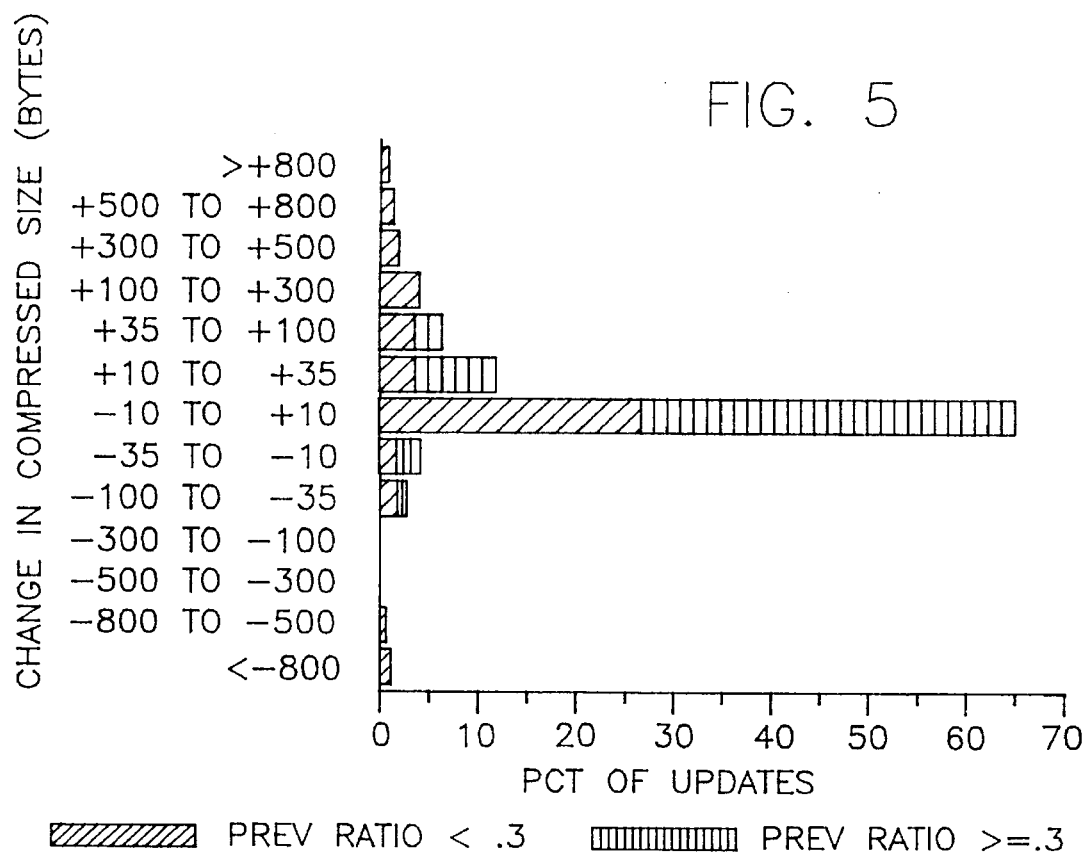
FIG. 5 is a graph depicting a histogram of a change in compressed bytes due to updates.
Figure 6:
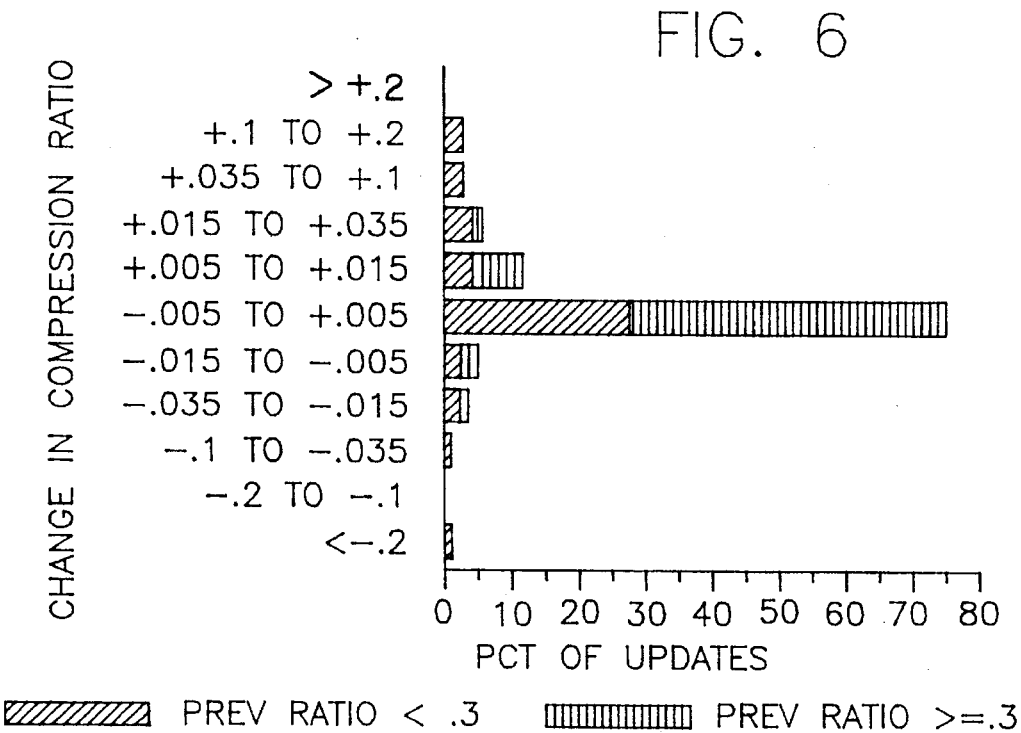
FIG. 6 is a graph depicting a histogram of a change in compression ratio due to updates.

For blocks that do occupy 30% or more of their nominal size, a further consideration is by what amount this storage requirement is likely to increase or decrease as the result of a subsequent update. FIGS. 5 and 6 each illustrate a histogram of observed levels of increase/decrease, as measured in bytes and in compression ratio, respectively, for update operations.

It is apparent that blocks occupying less than 30% of their nominal size (shown single-hatched) have a strong tendency to grow larger as a result of updates. Blocks occupying 30% or more (shown cross-hatched), however, have a tendency to neither grow or shrink on average. In this regard the average change in size due to an update was found to be approximately 1.5 bytes for these blocks.

As a result, and to insure a high probability (for example 99%) of an updated block fitting back into its allocated space, each block's allocated space is: (a) made to be at least 30% of the nominal track size for a track; and (b) a 5% pad is allocated over and above the compressed size of the track.

It should be apparent that this invention thus also teaches a method for operating a disk controller that includes the steps of allocating a first amount of disk space for a compressed data unit as a first predetermined percentage of an uncompressed size of the data unit; and increasing the allocation by a second predetermined percentage that is less than the first predetermined percentage to obtain a total amount of allocated disk space. In a presently preferred, but not limiting embodiment of this invention, the first predetermined percentage is approximately 30 percent, and the second predetermined percentage is approximately 5 percent. More generally, the first predetermined percentage is a function of an expected compression ratio for the data unit, and the second predetermined percentage is a function of an expected change in the size of the compressed data unit as a result of an update operation performed on the data unit.

The method further includes steps, executed in response to an update operation performed on the data unit, of compressing the updated data unit; comparing the size of the compressed updated data unit to the total amount of allocated disk space; and if the size of the compressed updated data unit is equal to or less than the total amount of allocated disk space, storing the compressed updated data unit within the allocated disk space. Otherwise, if the size of the compressed updated data unit is greater than the total amount of allocated disk space, the method allocates other disk space for storing the compressed data unit.

While the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. A data storage system, comprising:

a data compression unit for compressing a data unit prior to the data unit being written to a disk in said data storage unit; and a disk controller coupled to said disk for allocating contiguous space in said disk for writing a compressed data unit therein, said disk controller including means for comparing a size of a compressed data unit to an amount of said contiguous space previously allocated for the data unit, and for managing said disk in a log-structured manner wherein modifications, instead of being written in place in a data unit being modified, are written to said disk in a sequential log-like file structure and only when said compressed data unit is larger than the contiguous space previously allocated for the data unit.

2. A data storage system as set forth in claim 1 and further comprising:

a first buffer for storing an uncompressed data unit; and
   a second buffer for storing the compressed data unit;
   wherein said disk controller is responsive to data indicative of a number of bytes in the compressed data unit and in the uncompressed data unit for selectively writing either the content of the first buffer or the second buffer to said disk so as to write the fewest number of bytes to said disk.

3. A method for operating a disk controller, comprising the steps of:

allocating a first amount of disk space for a compressed data unit as a first predetermined percentage of an uncompressed size of the data unit; and increasing the allocation by a second predetermined percentage that is less than the first predetermined percentage to obtain a total amount of allocated disk space, wherein the first predetermined percentage is a function of an expected compression ratio for the data unit, and the second predetermined percentage is a function of an expected change in the size of the compressed data unit as a result of an update operation performed on the data unit.

4. A method as set forth in claim 3 wherein the first predetermined percentage is approximately 30 percent, and wherein the second predetermined percentage is approximately 5 percent.

5. A method as set forth in claim 3 and further including the steps of:

in response to an update operation performed on the data unit, compressing the updated data unit;

comparing the size of the compressed updated data unit to the total amount of allocated contiguous disk space for a compressed data unit; and if the size of the compressed updated data unit is equal to or less than the total amount of said allocated contiguous disk space, storing the compressed updated data unit within the allocated contiguous disk space; else if the size of the compressed updated data unit is greater than the total amount of allocated contiguous disk space, allocating other disk space for storing the compressed data unit.

6. A method as set forth in claim 3 wherein the first predetermined percentage is based on a most probable data compression ratio for the data unit, and wherein the second predetermined percentage is based on a most probable change in the size of the compressed data unit as a result of an update operation performed on the data unit.

7. A method for operating a disk controller, comprising the steps of:

allocating a first amount of contiguous disk space for a compressed data unit, the first amount being a first percentage of an uncompressed size of the data unit, wherein the first percentage is a function of a most probable data compression ratio for the data unit; and increasing the first amount of said contiguous disk space by a second percentage that is less than the first percentage to obtain a total amount of allocated contiguous disk space for said compressed data unit, wherein the second percentage is a function of a most probable change in the size of the compressed data unit as a result of an update operation performed on the data unit.

\* \* \* \* \*